C. D. SCHREIBEIS.
DRAG ATTACHMENT FOR HARROWS.
APPLICATION FILED DEC. 11, 1917.
1,299,043.
Patented Apr. 1, 1919.
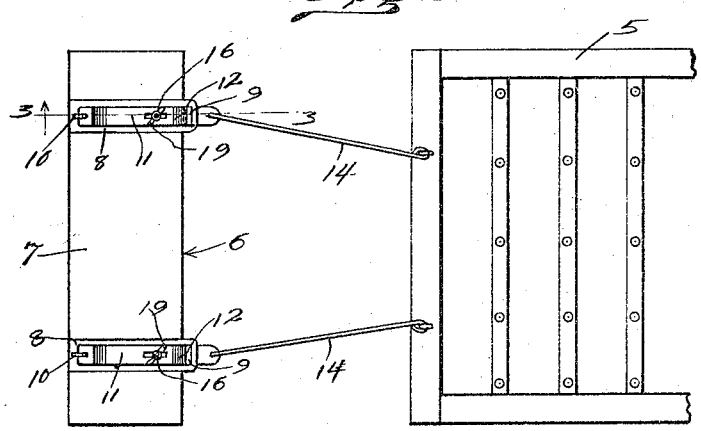
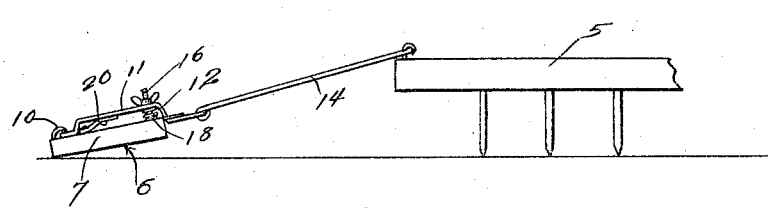
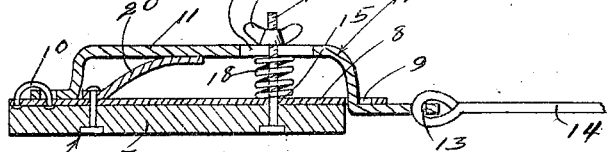
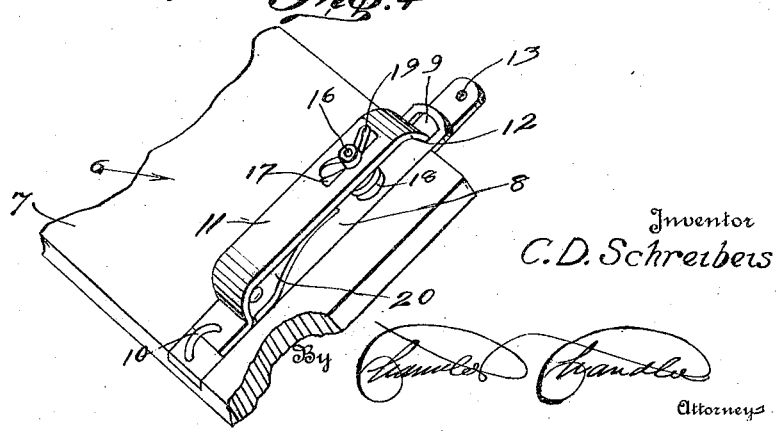
Inventor
C. D. Schreibeis
Witnesses

UNITED STATES PATENT OFFICE.

CHARLES D. SCHREIBEIS, OF YELLOWSTONE PARK, WYOMING.

DRAG ATTACHMENT FOR HARROWS.

1,299,043. Specification of Letters Patent. Patented Apr. 1, 1919.

Application filed December 11, 1917. Serial No. 206,623.

*To all whom it may concern:*

Be it known that I, CHARLES D. SCHREIBEIS, a citizen of the United States, residing at Yellowstone Park, in the National Park Res., State of Wyoming, have invented certain new and useful Improvements in Drag Attachments for Harrows; and I do hereby declare the following to be a full, clear, and exact description of the invention, such as will enable others skilled in the art to which it appertains to make and use the same.

This invention relates to a drag attachment for harrows and has for an object to provide a device of this character which is applicable to harrows generally and which embodies means of novel construction, arrangement and manipulation through the medium of which the drag may be adjusted to cut deep or shallow as desired.

With the above and other objects of similar nature in view, the invention consists in the construction, combination and arrangement of parts, set forth in and falling within the scope of the appended claims.

In the drawing:—

Figure 1 is a top plan view of a portion of a harrow with the invention associated therewith, Fig. 2 is a side view thereof, Fig. 3 is a detail section taken on the line 3—3 of Fig. 1, and Fig. 4 is a detail perspective view of one end of the drag.

Referring now more particularly to the accompanying drawing, there is shown a portion of a harrow 5 of conventional type to the rear end of which my improved drag is attached and designated generally at 6.

Specifically the drag consists of a beam 7 to the upper face of which and adjacent each end there is applied and fixedly secured a plate 8, said plate at one end extending slightly beyond the forward edge of the beam and terminating in a vertically opening guide eye 9. A staple 10 is secured to the opposite end of said plate 8 and has loosely engaged therewith for movement toward and away from said plate one end of a second plate 11. These plates 11 intermediate their ends are offset as at 12 from the plates 8 while their free ends extend angularly beyond the forward edge of the beam and are engaged slidably through the corresponding guide eye 9. Said free ends of the plate 11 are provided at their extremities with openings 13 with which suitable hitch elements 14 are connected and attached to the harrow 5 as shown.

The beam 7 and plates 8 are provided with registering apertures 15 through which are loosely passed bolts 16, while the plates 11 are slotted as at 17 to also receive said bolts.

Coil springs 18 encircle the bolts 16 and are interposed between the plates 8 and 11 to normally urge the same apart while wing nuts 19 are threaded on the bolts and are adapted to be tightened, as will be readily understood, to move the plates toward each other against the action of the springs 18. It will be readily apparent that as the plates 8 and 11 are adjusted toward or away from each other, the angle between the traversed surface and the under face of the beam will be correspondingly decreased or increased and the depth of cut of the beam in consequence regulated. To assist the springs 18 in urging the plates 8 and 11 apart there are provided in addition leaf springs 20 which are secured to the plates 8 and interposed between them and the plates 11.

Thus a simple durable and inexpensive drag is provided which may be quickly and conveniently regulated to suit the particular condition of the soil over which it is drawn.

What I claim is:—

1. A drag attachment for harrows comprising a beam and means for connecting it with a harrow, said connecting means including a member pivotally connected at one end transversely of the beam and having means at its opposite end for holding it yieldably at various angles to the beam, whereby the angle of the beam to the ground may be adjusted.

2. A drag attachment for harrows comprising a beam, slotted plates each pivoted at one end transversely of the beam and having each a longitudinal slot in its opposite end portion, means including elements passed through said slots and engaged with the beam for swinging the plates in the direction of the beam, means between the plates and the beam for urging the plates away from the beam and means connected with the plates beyond the slots from their pivoted ends, for connecting the beam with a harrow.

3. A drag attachment for harrows consisting of a beam, plates loosely connected at corresponding ends with the beam and adapted at their opposite ends for connection with a harrow, spring means normally urging said plates and beam apart, and means for adjusting said plates against the tendency of said spring means to regulate the depth of cut of the beam.

4. A drag attachment for harrows consisting of a beam, a plate fixed adjacent each end of the beam, a plate loosely connected at one end to each of the first named plates and adapted at its opposite end for connection with a harrow, a bolt passed loosely through each of said first and second named plates and through the beam, springs interposed between the plates normally urging the same apart, and means engaged on said bolts for adjusting the plates against the tendency of the springs to regulate the depth of cut of the beam.

In testimony whereof, I affix my signature in the presence of two witnesses.

CHARLES D. SCHREIBEIS.

Witnesses:
WILLIAM P. JOLLIFF,
HARRY R. DULIN.

Copies of this patent may be obtained for five cents each, by addressing the "Commissioner of Patents, Washington, D. C."